(12) United States Patent
Koster

(10) Patent No.: US 9,968,850 B2
(45) Date of Patent: May 15, 2018

(54) SYSTEM FOR PROVIDING VIRTUAL SPACES FOR ACCESS BY USERS

(75) Inventor: Raph Koster, San Diego, CA (US)

(73) Assignee: Disney Enterprises, Inc., Burbank, CA (US)

( * ) Notice: Subject to any disclaimer, the term of this patent is extended or adjusted under 35 U.S.C. 154(b) by 924 days.

(21) Appl. No.: 11/898,864

(22) Filed: Sep. 17, 2007

(65) Prior Publication Data

US 2009/0077463 A1    Mar. 19, 2009

(51) Int. Cl.
G06F 3/0481    (2013.01)
G06F 17/22    (2006.01)
(Continued)

(52) U.S. Cl.
CPC .............. *A63F 13/57* (2014.09); *A63F 13/10* (2013.01); *A63F 13/12* (2013.01); *A63F 13/35* (2014.09);
(Continued)

(58) Field of Classification Search
USPC ......... 715/234, 757, 706, 848; 345/473, 419
See application file for complete search history.

(56) References Cited

U.S. PATENT DOCUMENTS 5,525,765 A    6/1996  Freiheit ........................... 181/30
5,736,982 A *  4/1998  Suzuki et al. ................ 715/706
(Continued)

FOREIGN PATENT DOCUMENTS

EP    0 991 009    4/2000
WO   WO 2005/015505    2/2005
(Continued)

OTHER PUBLICATIONS

James, Daniel and Walton, Gordon, Editors, "2004 Persistent Worlds Whitepaper", IDGA Online Games SIG, <archives.igda.org/online/IGDA_PSW_Whitepaper_2004.pdf>, 82 pages.
(Continued)

*Primary Examiner* — Jeffrey A Gaffin
*Assistant Examiner* — Nhat Huy T Nguyen
(74) *Attorney, Agent, or Firm* — Sheppard Mullin Richter & Hampton LLP

(57)    ABSTRACT

A system configured to provide one or more virtual spaces that are accessible to users. The system may implement a markup language to communicate information between various components. The markup language may enable the communication of information between components of the system via markup elements. A markup element may include a discrete unit of information that includes both content and attributes associated with the content. The implementation of the markup language may enable the instantiation of virtual spaces, and the conveyance to users of views of an instantiated virtual space via a distributed architecture in which the components (e.g., a server capable of instantiating virtual spaces, and a client capable of providing an interface between a user and a virtual space) are capable of providing virtual spaces with a broader range of characteristics than components in conventional systems capable of providing virtual spaces that are accessible to users. This may enable users to access virtual spaces from a broader range of platforms, provide access to a broader range of virtual spaces without requiring the installation of proprietary or specialized client applications, facilitate the creation and/or customization of virtual spaces, and/or provide other enhancements.

2 Claims, 2 Drawing Sheets

(51) Int. Cl.
*G06F 17/27* (2006.01)
*A63F 13/57* (2014.01)
*A63F 13/35* (2014.01)
*A63F 13/40* (2014.01)
*A63F 13/30* (2014.01)

(52) U.S. Cl.
CPC . *A63F 2300/552* (2013.01); *A63F 2300/5533* (2013.01); *A63F 2300/63* (2013.01); *A63F 2300/64* (2013.01); *A63F 2300/66* (2013.01); *A63F 2300/8082* (2013.01)

(56) References Cited

U.S. PATENT DOCUMENTS

| | | | |
|---|---|---|---|
| 5,950,202 A | 9/1999 | Durward et al. | 707/10 |
| 6,009,458 A | 12/1999 | Hawkins et al. | 709/203 |
| 6,219,045 B1* | 4/2001 | Leahy et al. | 715/757 |
| 6,289,248 B1* | 9/2001 | Conley et al. | 607/59 |
| 6,323,857 B1 | 11/2001 | Mielekamp et al. | 345/419 |
| 6,493,001 B1* | 12/2002 | Takagi et al. | 715/759 |
| 6,791,549 B2* | 9/2004 | Hubrecht et al. | 345/473 |
| 6,961,060 B1* | 11/2005 | Mochizuki et al. | 345/473 |
| 7,454,715 B2 | 11/2008 | Chen et al. | 715/850 |
| 7,534,169 B2 | 5/2009 | Amaitis et al. | 463/39 |
| 7,577,847 B2 | 8/2009 | Nguyen et al. | 713/186 |
| 7,587,276 B2 | 9/2009 | Gold et al. | 701/211 |
| 7,587,338 B2 | 9/2009 | Owa | 705/26 |
| 7,681,114 B2 | 3/2010 | Ambrosino et al. | 715/201 |
| 7,703,023 B2* | 4/2010 | O'Mahony et al. | 715/745 |
| 7,788,323 B2 | 8/2010 | Greenstein et al. | 709/204 |
| 7,797,261 B2* | 9/2010 | Yang | 706/45 |
| 7,827,507 B2 | 11/2010 | Geise et al. | 715/850 |
| 7,904,577 B2* | 3/2011 | Taylor | 709/230 |
| 8,027,784 B2 | 9/2011 | Geelen | 701/201 |
| 8,066,571 B2 | 11/2011 | Koster et al. | 463/42 |
| 8,196,050 B2 | 6/2012 | Riley et al. | 715/757 |
| 2001/0049787 A1* | 12/2001 | Morikawa et al. | 713/156 |
| 2002/0049814 A1 | 4/2002 | Yoo | 709/205 |
| 2002/0054163 A1* | 5/2002 | Yamada et al. | 345/848 |
| 2002/0082910 A1 | 6/2002 | Kontogouris | 705/14 |
| 2002/0112033 A1 | 8/2002 | Doemling et al. | 709/219 |
| 2002/0169670 A1 | 11/2002 | Barsade et al. | 705/14 |
| 2003/0008713 A1* | 1/2003 | Ushiro et al. | 463/42 |
| 2003/0046689 A1 | 3/2003 | Gaos | 725/34 |
| 2003/0064705 A1 | 4/2003 | Desiderio | 455/412 |
| 2003/0231212 A1* | 12/2003 | Slemmer et al. | 345/771 |
| 2004/0014527 A1 | 1/2004 | Orr et al. | 463/43 |
| 2004/0230458 A1* | 11/2004 | Takayama et al. | 705/3 |
| 2005/0033511 A1 | 2/2005 | Pechatnikov et al. | 701/210 |
| 2005/0091111 A1 | 4/2005 | Green et al. | 705/14 |
| 2005/0160141 A1 | 7/2005 | Galley et al. | 709/204 |
| 2005/0210395 A1 | 9/2005 | Wakita et al. | 715/753 |
| 2006/0015814 A1 | 1/2006 | Rappaport et al. | 715/733 |
| 2006/0211462 A1 | 9/2006 | French et al. | 463/1 |
| 2006/0223635 A1 | 10/2006 | Rosenberg | 463/37 |
| 2006/0265483 A1* | 11/2006 | Wang et al. | 709/223 |
| 2006/0287815 A1 | 12/2006 | Gluck | 701/208 |
| 2007/0020603 A1* | 1/2007 | Woulfe | 434/350 |
| 2007/0021213 A1 | 1/2007 | Foe et al. | 463/42 |
| 2007/0027628 A1 | 2/2007 | Geelen | 701/213 |
| 2007/0050716 A1* | 3/2007 | Leahy et al. | 715/706 |
| 2007/0082738 A1* | 4/2007 | Fickie et al. | 463/42 |
| 2007/0083323 A1 | 4/2007 | Rosenberg | 701/200 |
| 2007/0190494 A1 | 8/2007 | Rosenberg | 434/11 |
| 2007/0288598 A1* | 12/2007 | Edeker et al. | 709/217 |
| 2008/0052054 A1 | 2/2008 | Beverina et al. | 703/6 |
| 2008/0082311 A1 | 4/2008 | Meijer et al. | 703/24 |
| 2008/0094417 A1 | 4/2008 | Cohen | 345/632 |
| 2008/0134056 A1 | 6/2008 | Shuster | 715/757 |
| 2008/0221790 A1 | 9/2008 | Min et al. | 701/209 |
| 2008/0280684 A1* | 11/2008 | McBride et al. | 463/42 |
| 2009/0036216 A1* | 2/2009 | Ratcliff | 463/42 |
| 2009/0040186 A1 | 2/2009 | Esenther | 345/173 |
| 2009/0077158 A1 | 3/2009 | Riley et al. | 709/202 |
| 2009/0077475 A1 | 3/2009 | Koster et al. | 715/757 |
| 2009/0307226 A1 | 12/2009 | Koster et al. | 707/10 |
| 2009/0307611 A1 | 12/2009 | Riley | 715/757 |
| 2010/0058235 A1* | 3/2010 | Borst | 715/810 |
| 2010/0094547 A1 | 4/2010 | Geelen et al. | 701/209 |
| 2010/0095213 A1 | 4/2010 | Koster et al. | 715/733 |
| 2010/0311483 A1* | 12/2010 | Fields et al. | 463/2 |
| 2012/0059881 A1 | 3/2012 | Koster et al. | 709/204 |
| 2012/0221417 A1 | 8/2012 | Riley et al. | 705/14.66 |

FOREIGN PATENT DOCUMENTS

| | | |
|---|---|---|
| WO | WO 2009/039080 | 3/2009 |
| WO | WO 2009/039084 | 3/2009 |
| WO | WO 2009/039085 | 3/2009 |
| WO | WO 2009/152074 | 12/2009 |
| WO | WO 2009/152077 | 12/2009 |
| WO | WO 2010/042783 | 4/2010 |

OTHER PUBLICATIONS

WoWWiki, Paid Character Transfer FAQ (US), Feb. 23, 2007, Blizzard Entertainment, <www.wowwiki.com/Paid_Character_Transfer_FAQ_(US)>, 6 pages.

Linden Research, Inc., "Second Life Wiki: Second Life Work/FAQs", Nov. 9, 2009, Linden Research, Inc., <http://wiki.secondlife.com/wiki/Second_Life_Work/FAQs>, 2 pages.

Blizzard Entertainment, Inc., World of Warcraft Manual 2004, Blizzard Entertainment, <willishome.com/Manual.pdf>, 114 pages.

Kumar, Sanjeev, et al., "Second Life and the New Generation of Virtual Worlds", *Computer*, vol. 41, No. 9, Sep. 2008, pp. 46-53, doi: 10.1109/MC.2008.398, http://ieeexplore.ieee.org/stamp/stamp.jsd?tp-&arnumber=4623222&isnumber=4623205, 8 pages.

Wilson, Tracy V., "How World of Warcraft Works", Nov. 16, 2007, HowStuffWorks.com, http://electronics.howstuffworks.com/world-of-warcraft.htm, Apr. 13, 2011, 4 pages.

Hartman, Jed, et al., *The VRML 2.0 Handbook; Building Moving Worlds on the Web*, Addison-Wesley Publishing Company, © 1996 Silicon Graphics Inc., 40 pages.

\* cited by examiner

SYSTEM FOR PROVIDING VIRTUAL SPACES FOR ACCESS BY USERS

FIELD OF THE INVENTION

The invention relates to systems configured to provide virtual spaces for access by users.

BACKGROUND OF THE INVENTION

Systems that provide virtual worlds and/or virtual gaming spaces accessible to a plurality of users for real-time interaction are known. Such systems tend to be implemented with some rigidity with respect to the characteristics of the virtual worlds that they provide. For example, systems supporting gaming spaces are generally only usable to provide spaces within a specific game. As another example, systems that attempt to enable users to create and/or customize the virtual worlds typically limit the customization to structures and/or content provided in the virtual worlds.

These systems generally rely on dedicated, specialized applications that may limit customizability and/or usability by end-users. For example, systems typically require a dedicated browser (or some other client application) to interact with a virtual world. These dedicated browsers may require local processing and/or storage capabilities to further process information for viewing by end-users. Platforms that are designed for mobility and/or convenience may not be capable of executing these types of dedicated browsers. Further, the requirements of dedicated browsers capable of displaying virtual worlds may be of a storage size and/or may require processing resources that discourage end-users from installing them on client platforms. Similarly, in systems in which servers are implemented to execute instances of virtual worlds, the applications required by the server may be tailored to execute virtual worlds of a single "type." This may limit the variety of virtual worlds that can be created and/or provided to end-users.

SUMMARY

One aspect of the invention relates to a system configured to provide one or more virtual spaces that are accessible to users. The system may instantiate virtual spaces, and convey to users of views of an instantiated virtual space, via a distributed architecture in which the components (e.g., a server capable of instantiating virtual spaces, and a client capable of providing an interface between a user and a virtual space) are capable of providing virtual spaces with a broader range of characteristics than components in conventional systems. The distributed architecture may be accomplished in part by implementing communication between the components that facilitates instantiation of the virtual space and conveyance of views of the virtual space by the components of the system for a variety of different types of virtual spaces with a variety of different characteristics without invoking applications on the components that are suitable for only limited types of virtual spaces (and/or their characteristics). For example, the system may be configured such that in instantiating and/or conveying the virtual space to the user, components of the system may avoid assumptions about characteristics of the virtual space being instantiated and/or conveyed to the user, but instead may communicate information defining such characteristics upon invocation of the instantiation and/or conveyance to the user.

The system, in part by virtue of its flexibility, may enable enhanced customization of a virtual space by a user. For example, the system may enable the user to customize the characteristics of the virtual space and/or its contents. The flexibility of the components of the system in providing various types of virtual spaces with a range of possible characteristics may enable users to access virtual spaces from a broader range of platforms, provide access to a broader range of virtual spaces without requiring the installation of proprietary or specialized client applications, facilitate the creation and/or customization of virtual spaces, and/or provide other enhancements.

According to various embodiments, at least some of the communication between the components of the system may be accomplished via a markup language. The markup language may include the transmission of information between the components in a markup element format. A markup element may be a discrete unit of information that includes both content and attributes associated with the content. The markup language may include a plurality of different types of elements, that denote the type of content and the nature of the attributes to be included in the element. In some implementations, content within a given markup element may be denoted by reference (rather than transmission of the actual content). For example, the content may be denoted by an access location at which the content may be accessed. The access location may include a network address (e.g., a URL), a file system address, and/or other access locations from which the component receiving the given markup language may access the referenced content. The implementation of the markup language may enhance the efficiency with which the communication within the system is achieved.

In some embodiments, the system may include a storage module, a server, a client, and/or other components. The storage module and the client may be in operative communication with the server. The system may be configured such that information related to a given virtual space may be transmitted from the storage module to the server, which may then instantiate the given virtual space. Views of the given virtual space may be generated by the server from the instance of the virtual space being executed on the server. Information related to the views may be transmitted from the server to the client to enable the client to format the views for display to a user. The server may generate views to accommodate limitations of the client (e.g., in processing capability, in content display, etc.) communicated from the client to the server.

By virtue of amount of information communicated efficiently between the components of the system (e.g., in the markup language), information may be transmitted from the storage module to the server that configures the server to instantiate the virtual space at or near the time of instantiation. The configuration of the server by the information transmitted from the storage module may include providing information to the server regarding the topography of the given virtual space, the manner in which objects and/or unseen forces are manifested in the virtual space, the perspective from which views should be generated, the number of users that should be permitted to interact with the virtual space simultaneously, the dimensionality of the views of the given virtual space, the passage of time in the given virtual space, and/or other parameters or characteristics of the virtual space. Similarly, information transmitted from the server to the client via markup elements of the markup language may enable the client to generate views of the given virtual space by merely assembling the information indicated in markup elements. The implementation of the markup language may facilitate creation of a new virtual space by the user of the client, and/or the customization/refinement of existing virtual spaces.

The storage module may include information storage and a server communication module. The information storage may store one or more space records that correspond to one or more individual virtual spaces. A given space record may contain the information that describes the characteristics of a virtual space that corresponds to the given space record. The server communication module may be configured to generate markup elements in the markup language that convey the information stored within the given space record to enable the virtual space that corresponds to the given space record to be instantiated on the server. These markup elements may then be communicated to the server.

The server may include a communication module, an instantiation module, and a view module. The communication module may receive the markup elements from the storage module associated with a given virtual space. Since the markup elements received from the storage module may comprise information regarding substantially all of the characteristics of the given virtual space, the instantiation module may execute an instance of the given virtual space without making assumptions and/or calculations to determine characteristics of the given virtual space. As has been mentioned above, this may enable the instantiation module to instantiate a variety of different "types" of virtual spaces without the need for a plurality of different instancing applications. From the instance of the given virtual space executed by the instantiation module, the view module may determine a view of the given virtual space to be provided to a user. The view may be taken from a point of view, a perspective, and/or a dimensionality dictated by the markup elements received from the storage module. The view module may generate markup elements that describe the determined view. The markup elements may be generated to describe the determined view in a manner that accommodates one or more limitations of the client that have previously been communicated from the client to the server. These markup elements may then be communicated to the client by the communication module.

The client may include a view display, a user interface, a view display module, an interface module, and a server communication module. The view display may display a view of a given virtual space described by markup elements received from the server. The view display module may format the view for display on the view display by assembling view information contained in the markup elements received by the client from the server. Assembling the view information contained in the markup elements may include providing the content identified in the markup elements according to the attributes dictated by the markup elements. The view information contained in the markup elements may describe a complete view, without the need for further processing. For example, further processing on the client to account for lighting effects, shading, and/or movement, beyond the content and attribute information provided in the markup elements, may not be necessary to format the view for display on the view display. For example, determination of complete motion paths, decision-making, scheduling, triggering, and/or other operations requiring processing beyond the assembly of view information may not be required of the client. In some embodiments, the client may assemble the view information according to one or more abilities and/or limitations. For instance, if the functionality of the client is relatively limited, the client may assemble view information of a three-dimensional view as a less sophisticated two dimensional version of the view by disregarding at least a portion of the view information.

The user interface provided by the client may enable the user to input information to the system. The information may be input in the form of commands initially provided from the server to the client (e.g., as markup elements of the markup language). For example, commands to be executed in the virtual space may be input by the user via the user interface. These commands may be communicated by the client to the server, where the instantiation module may manipulate the instance of the virtual space according to the commands input by the user on the client. These manipulations may then be reflected in views of the instance determined by the view module of the server.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
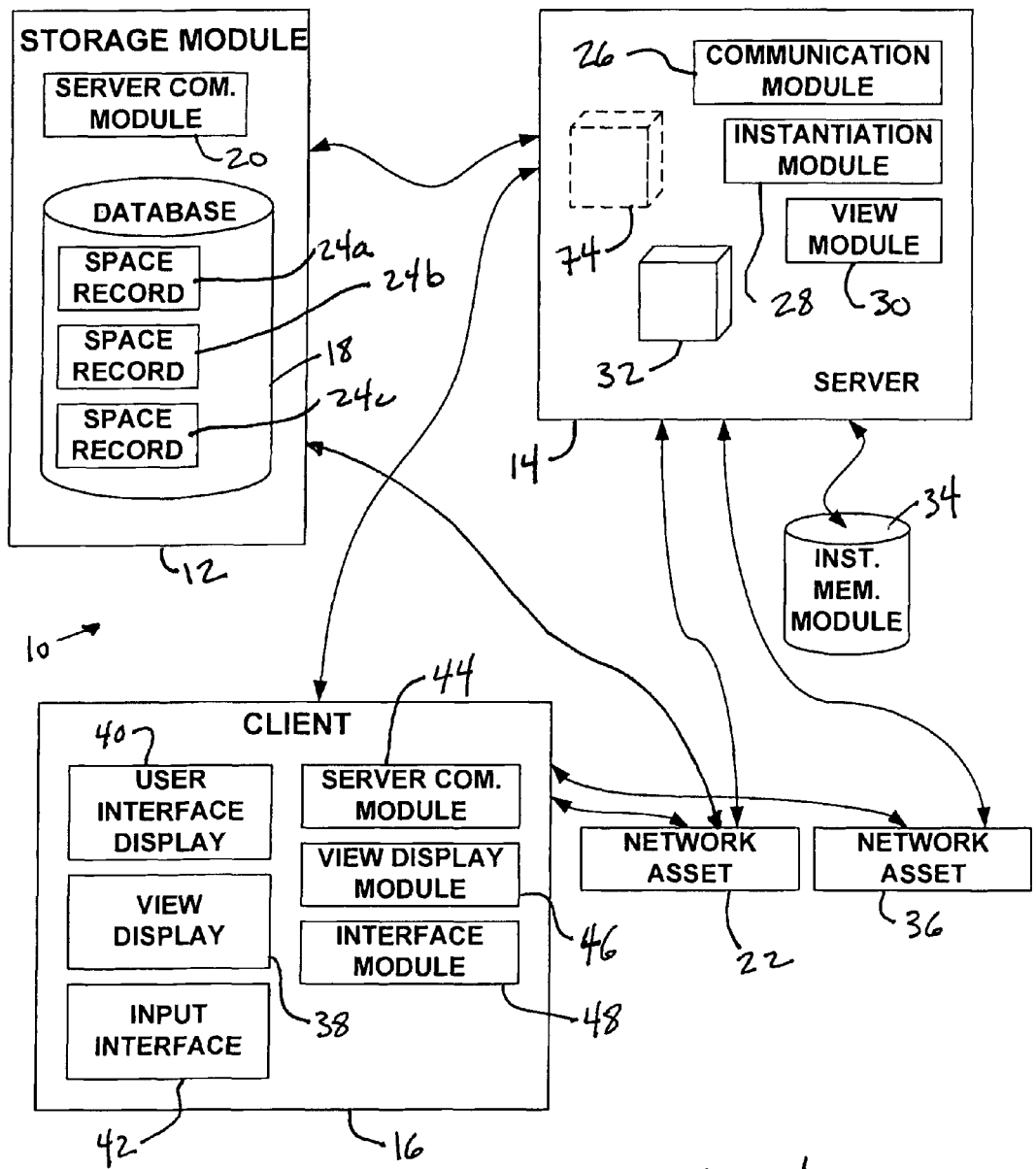
FIG. 1 illustrates a system configured to provide one or more virtual spaces that may be accessible to users, according to one or more embodiments of the invention.

FIG. 1 illustrates a system 10 configured to provide one or more virtual spaces that may be accessible to users. In some embodiments, system 10 may include a storage module 12, a server 14, a client 16, and/or other components. Storage module 12 and client 16 may be in operative communication with server 14. System 10 is configured such that information related to a given virtual space may be transmitted from storage module 12 to server 14, which may then instantiate the virtual space being run on server 14. Views of the virtual space may be generated by server 14 from the instance of the virtual space. Information related to the views may be transmitted from server 14 to client 16 to enable client 16 to format the views for display to a user. System 10 may implement a markup language for communication between components (e.g., storage module 12, server 14, client 16, etc.). Information may be communicated between components via markup elements of the markup language. By virtue of communication between the components of system 10 in the markup language, various enhancements may be achieved. For example, information may be transmitted from storage module 12 to server 14 that configures server 14 to instantiate the virtual space may be provided to server 14 via the markup language at or near the time of instantiation. Similarly, information transmitted from server 14 to client 16 may enable client 16 to generate views of the virtual space by merely assembling the information indicated in markup elements communicated thereto. The implementation of the markup language may facilitate creation of a new virtual space by the user of client 16, and/or the customization/refinement of existing virtual spaces.

As used herein, a virtual space may comprise a simulated space (e.g., a physical space) instanced on a server (e.g., server 14) that is accessible by a client (e.g., client 16), located remotely from the server, to format a view of the virtual space for display to a user of the client. The simulated space may have a topography, express real-time interaction by the user, and/or include one or more objects positioned within the topography that are capable of locomotion within the topography. In some instances, the topography may be a 2-dimensional topography. In other instances, the topography may be a 3-dimensional topography. In some instances, the topography may be a single node. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

As used herein, the term "markup language" may include a language used to communicate information between components via markup elements. Generally, a markup element is a discrete unit of information that includes both content and attributes associated with the content. The markup language may include a plurality of different types of elements that denote the type of content and the nature of the attributes to be included in the element. For example, in some embodiments, the markup elements in the markup language may be of the form [O_HERE]|objectId|artIndex|x|y|z|name|templateId. This may represent a markup element for identifying a new object in a virtual space. The parameters for the mark-up element include: assigning an object Id for future reference for this object, telling the client what art to draw associated with this object, the relative x, y, and z position of the object, the name of the object, and data associated with the object (comes from the template designated). As another non-limiting example, a mark-up element may be of the form [O_GONE]|objId. This mark-up element may represent an object going away from the perspective of a view of the virtual space. As yet another example, a mark-up element may be of the form [O_MOVE] |objectId|x|y|z. This mark-up element may represent an object that has teleported to a new location in the virtual space. As still another example, a mark-up element may be of the form [O_SLIDE]|objectId|x|y|z|time. This mark-up element may represent an object that is gradually moving from one location in the virtual space to a new location over a fixed period of time. It should be appreciated that these examples are not intended to be limiting, but only to illustrate a few different forms of the markup elements.

Storage module 12 may include information storage 18, a server communication module 20, and/or other components. Generally, storage module 12 may store information related to one or more virtual spaces. The information stored by storage module 12 that is related to a given virtual space may include topographical information related to the topography of the given virtual space, manifestation information related to the manifestation of one or more objects positioned within the topography and/or unseen forces experienced by the one or more objects in the virtual space, interface information related to an interface provided to the user that enables the user to interact with the virtual space, space parameter information related to parameters of the virtual space, and/or other information related to the given virtual space.

The manifestation of the one or more objects may include the locomotion characteristics of the one or more objects, the size of the one or more objects, the identity and/or nature of the one or more objects, interaction characteristics of the one or more objects, and/or other aspect of the manifestation of the one or more objects. The interaction characteristics of the one or more objects described by the manifestation information may include information related to the manner in which individual objects interact with and/or are influenced by other objects, the manner in which individual objects interact with and/or are influenced by the topography (e.g., features of the topography), the manner in which individual objects interact with and/or are influenced by unseen forces within the virtual space, and/or other characteristics of the interaction between individual objects and other forces and/or objects within the virtual space. The interaction characteristics of the one or more objects described by the manifestation information may include scriptable behaviors and, as such, the manifestation stored within storage module 12 may include one or both of a script and a trigger associated with a given scriptable behavior of a given object (or objects) within the virtual space. The unseen forces present within the virtual space may include one or more of gravity, a wind current, a water current, an unseen force emanating from one of the objects (e.g., as a "power" of the object), and/or other unseen forces (e.g., unseen influences associated with the environment of the virtual space such as temperature and/or air quality).

In some embodiments, the manifestation information may include information related to the sonic characteristics of the one or more objects positioned in the virtual space. The sonic characteristics may include the emission characteristics of individual objects (e.g., controlling the emission of sound from the objects), the acoustic characteristics of individual objects, the influence of sound on individual objects, and/or other characteristics of the one or more objects. In such embodiments, the topographical information may include information related to the sonic characteristics of the topography of the virtual space. The sonic characteristics of the topography of the virtual space may include acoustic characteristics of the topography, and/or other sonic characteristics of the topography.

According to various embodiments, content included within the virtual space (e.g., visual content formed on portions of the topography or objects present in the virtual space, objects themselves, etc.) may be identified within the information stored in storage module 12 by reference only. For example, rather than storing a structure and/or a texture associated with the structure, storage module 12 may instead store an access location at which visual content to be implemented as the structure (or a portion of the structure) or texture can be accessed. In some implementations, the access location may include a URL that points to a network location. The network location identified by the access location may be associated with a network asset 22. Network asset 22 may be located remotely from each of storage module 12, server 14, and client 16. For example, the access location may include a network URL address (e.g., an internet URL address, etc.) at which network asset 22 may be accessed.

It should be appreciated that not only solid structures within the virtual space may be identified in the information stored in storage module 12 may be stored by reference only. For example, visual effects that represent unseen forces or influences may be stored by reference as described above. Further, information stored by reference may not be limited to visual content. For example, audio content expressed within the virtual space may be stored within storage module 12 by reference, as an access location at which the audio content can be accessed. Other types of information (e.g., interface information, space parameter information, etc.) may be stored by reference within storage module 12.

The interface information stored within storage module 12 may include information related to an interface provided to the user that enables the user to interact with the virtual space. More particularly, in some implementations, the interface information may include a mapping of an input device provided at client 16 to commands that can be input by the user to system 10. For example, the interface information may include a key map that maps keys in a keyboard (and/or keypad) provided to the user at client 16 to commands that can be input by the user to system 10. As another example, the interface information may include a map that maps the inputs of a mouse (or joystick, or trackball, etc.) to commands that can be input by the user to system 10. In some implementations, the interface information may include information related to a configuration of a user interface display provided to the user at client that enables the user to input information to system 10. For example, the user interface may enable the user to input communication to other users interacting with the virtual space, input actions to be performed by one or more objects within the virtual space, request a different point of view for the view, request a more (or less) sophisticated view (e.g., a 2-dimensional view, a 3-dimensional view, etc.), request one or more additional types of data for display in the user interface display, and/or input other information.

The user interface display may be configured (e.g., by the interface information stored in storage module 12) to provide information to the user about conditions in the virtual space that may not be apparent simply from viewing the space. For example, such conditions may include the passage of time, ambient environmental conditions, and/or other conditions. The user interface display may be configured (e.g., by the interface information stored in storage module 12) to provide information to the user about one or more objects within the space. For instance, information may be provided to the user about objects associated with the topography of the virtual space (e.g., coordinate, elevation, size, identification, age, status, etc.). In some instances, information may be provided to the user about objects that represent animate characters (e.g., wealth, health, fatigue, age, experience, etc.). For example, such information may be displayed to the user that is related to an object that represents an incarnation associated with client 16 in the virtual space (e.g., an avatar, a character being controlled by the user, etc.).

The space parameter information may include information related to one or more parameters of the virtual space. Parameters of the virtual space may include, for example, the rate at which time passes, dimensionality of objects within the virtual space (e.g., 2-dimensional vs. 3-dimensional), permissible views of the virtual space (e.g., first person views, bird's eye views, 2-dimensional views, 3-dimensional views, fixed views, dynamic views, selectable views, etc.), and/or other parameters of the virtual space. In some instances, the space parameter information includes information related to the game parameters of a game provided within the virtual space. For instance, the game parameters may include information related to a maximum number of players, a minimum number of players, the game flow (e.g., turn based, real-time, etc.), scoring, spectators, and/or other game parameters of a game.

The information related to the plurality of virtual spaces may be stored in an organized manner within information storage 18. For example, the information may be organized into a plurality of space records 24 (illustrated as space record 24a, space record 24b, and space record 24c). Individual ones of space records 24 may correspond to individual ones of the plurality of virtual spaces. A given space record 24 may include information related to the corresponding virtual space. In some embodiments, the space records 24 may be stored together in a single hierarchal structure (e.g., a database, a file system of separate files, etc.). In some embodiments, space records 24 may include a plurality of different "sets" of space records 24, wherein each set of space records includes one or more of space records 24 that is stored separately and discretely from the other space records 24.

Although information storage 18 is illustrated in FIG. 1 as a single entity, this is for illustrative purposes only. In some embodiments, information storage 18 includes a plurality of informational structures that facilitate management and storage of the information related to the plurality of virtual spaces. Information storage 18 may include not only the physical storage elements for storing the information related to the virtual spaces but may include the information processing and storage assets that enable information storage 18 to manage, organize, and maintain the stored information. Information storage 18 may include a relational database, an object oriented database, a hierarchical database, a post-relational database, flat text files (which may be served locally or via a network), XML files (which may be served locally or via a network), and/or other information structures.

In some embodiments, in which information storage 18 includes a plurality of informational structures that are separate and discrete from each other, information storage 18 may further include a central information catalog that includes information related to the location of the space records included therein (e.g., network and/or file system addresses of individual space records). The central information catalog may include information related to the location of instances virtual spaces (e.g., network addresses of servers instancing the virtual spaces). In some embodiments, the central information catalog may form a clearing house of information that enables users to initiate instances and/or access instances of a chosen virtual space. Accordingly, access to the information stored within the central information catalog may be provided to users based on privileges (e.g., earned via monetary payment, administrative privileges, earned via previous game-play, earned via membership in a community, etc.).

Server communication module 20 may facilitate communication between information storage 18 and server 14. In some embodiments, server communication module 20 enables this communication by formatting communication between information storage 18 and server 14. This may include, for communication transmitted from information storage 18 to server 14, generating markup elements (e.g., "tags") that convey the information stored in information storage 18, and transmitting the generated markup elements to server 14. For communication transmitted from server 14 to information storage 18, server communication module 20 may receive markup elements transmitted from server 14 to storage module 12 and may reformat the information for storage in information storage 18.

Server 14 may be provided remotely from storage module 12. Communication between server 14 and storage module 12 may be accomplished via one or more communication media. For example, server 14 and storage module 12 may communicate via a wireless medium, via a hard-wired medium, via a network (e.g., wireless or wired), and/or via other communication media. In some embodiments, server 14 may include a communication module 26, an instantiation module 28, a view module 30, and/or other modules. Modules 26, 28, and 30 may be implemented in software; hardware; firmware; some combination of software, hardware, and/or firmware; and/or otherwise implemented. It should be appreciated that although modules 26, 28, and/or 30 are illustrated in FIG. 1 as being co-located within a single unit (server 14), in some implementations, server 14 may include multiple units and modules 26, 28, and/or 30 may be located remotely from the other modules.

Communication module 26 may be configured to communicate with storage module 12 and/or client 16. Communicating with storage module 12 and/or client 16 may include transmitting and/or receiving markup elements of the markup language. The markup elements received by communication module 26 may be implemented by other modules of server 14, or may be passed between storage module 12 and client 16 via server 14 (as server 14 serves as an intermediary therebetween). The markup elements transmitted by communication module 26 to storage module 12 or client 16 may include markup elements being communicated from storage module to client 16 (or vice versa), or the markup elements may include markup elements generated by the other modules of server 14.

Instantiation module 28 may be configured to instantiate a virtual space, which would result in an instance 32 of the virtual space present on server 14. Instantiation module 28 may instantiate the virtual space according to information received in markup element form from storage module 12. Instantiation module 28 may comprise an application that is configured to instantiate virtual spaces based on information conveyed thereto in markup element form. The application may be capable of instantiating a virtual space without accessing a local source of information that describes various aspects of the configuration of the virtual space (e.g., manifestation information, space parameter information, etc.), or without making assumptions about such aspects of the configuration of the virtual space. Instead, such information may be obtained by instantiation module 28 from the markup elements communicated to server 14 from storage module 12. This may provide one or more enhancements over systems in which an application executed on a server instantiates a virtual space (e.g., in "World of Warcraft"). For example, the application included in instantiation module 28 may be capable of instantiating a wider variety of "types" of virtual spaces (e.g., virtual worlds, games, 3-D spaces, 2-D spaces, spaces with different views, first person spaces, birds-eye spaces, real-time spaces, turn based spaces, etc.).

Instance 32 may be characterized as a simulation of the virtual space that is being executed on server 14 by instantiation module 30. The simulation may include determining in real-time the positions, structure, and manifestation of objects, unseen forces, and topography within the virtual space according to the topography, manifestation, and space parameter information that corresponds to the virtual space. As has been discussed above, various portions of the content that make up the virtual space embodied in instance 32 may be identified in the markup elements received from storage module 12 by reference. In such cases, instantiation module 28 may be configured to access the content at the access location identified (e.g., at network asset 22, as described above) in order to account for the nature of the content in instance 32.

As instance 32 is maintained by instantiation module 28 on server 14, and the position, structure, and manifestation of objects, unseen forces, and topography within the virtual space varies, instantiation may implement an instance memory module 34 to store information related to the present state of instance 32. Instance memory module 34 may be provided locally to server 14 (e.g., integrally with server 14, locally connected with server 14, etc.), or instance memory module 34 may be located remotely from server 14 and an operative communication link may be formed therebetween.

View module 30 may be configured to implement instance 32 to determine a view of the virtual space. The view of the virtual space may be from a fixed location or may be dynamic (e.g., may track an object). In some implementations, an incarnation associated with client 16 (e.g., an avatar) may be included within instance 32. In these implementations, the location of the incarnation may influence the view determined by view module 30 (e.g., track with the position of the incarnation, be taken from the perspective of the incarnation, etc.). The view may be determined from a variety of different perspectives (e.g., a bird's eye view, an elevation view, a first person view, etc.). The view may be a 2-dimensional view or a 3-dimensional view. These and/or other aspects of the view may be determined based on information provided from storage module 12 via markup elements (e.g., as space parameter information). Determining the view may include determining the identity, shading, size (e.g., due to perspective), motion, and/or position of objects, effects, and/or portions of the topography that would be present in a rendering of the view.

View module 30 may generate a plurality of markup elements that describe the view based on the determination of the view. The plurality of markup elements may describe identity, shading, size (e.g., due to perspective), and/or position of the objects, effects, and/or portions of the topography that should be present in a rendering of the view. The markup elements may describe the view "completely" such that the view can be formatted for viewing by the user by simply assembling the content identified in the markup elements according to the attributes of the content provided in the markup elements. In such implementations, assembly alone may be sufficient to achieve a display of the view of the virtual space, without further processing of the content (e.g., to determine motion paths, decision-making, scheduling, triggering, etc.).

In some implementations, view module 30 may generate the markup elements to describe a series of "snapshots" of the view at a series of moments in time. The information describing a given "snapshot" may include one or both of dynamic information that is to be changed or maintained and static information included in a previous markup element that will be implemented to format the view until it is changed by another markup element generated by view module 30. It should be appreciated that the use of the words "dynamic" and "static" in this context do not necessarily refer to motion (e.g., because motion in a single direction may be considered static information), but instead to the source and/or content of the information.

In some instances, information about a given object described in a "snapshot" of the view will include motion information that describes one or more aspects of the motion of the given object. Motion information may include a direction of motion, a rate of motion for the object, and/or other aspects of the motion of the given object, and may pertain to linear and/or rotational motion of the object. The motion information included in the markup elements will enable client 16 to determine instantaneous motion of the given object, and any changes in the motion of the given object within the view may be controlled by the motion information included in the markup elements such that independent determinations by client 16 of the motion of the given object may not be performed. The differences in the "snapshots" of the view account for dynamic motion of content within the view and/or of the view itself. The dynamic motion controlled by the motion information included in the markup elements generated by view module 30 may describe not only motion of objects in the view relative to the frame of the view and/or the topography, but may also describe relative motion between a plurality of objects. The description of this relative motion may be used to provide more sophisticated animation of objects within the view. For example, a single object may be described as a compound object made up of constituent objects. One such instance may include portrayal of a person (the compound object), which may be described as a plurality of body parts that move relative to each other as the person walks, talks, emotes, and/or otherwise moves in the view (e.g., the head, lips, eyebrows, eyes, arms, legs, feet, etc.). The manifestation information provided by storage module 12 to server 14 related to the person (e.g., at startup of instance 32) may dictate the coordination of motion for the constituent objects that make up the person as the person performs predetermined tasks and/or movements (e.g., the manner in which the upper and lower legs and the rest of the person move as the person walks). View module 30 may refer to the manifestation information associated with the person that dictates the relative motion of the constituent objects of the person as the person performs a predetermined action. Based on this information, view module 30 may determine motion information for the constituent objects of the person that will account for relative motion of the constituent objects that make up the person (the compound object) in a manner that conveys the appropriate relative motion of the constituent parts, thereby animating the movement of the person in a relatively sophisticated manner.

In some embodiments, the markup elements generated by view module 30 that describe the view identify content (e.g., visual content, audio content, etc.) to be included in the view by reference only. For example, as was the case with markup elements transmitted from storage module 12 to server 14, the markup elements generated by view module 30 may identify content by a reference to an access location. The access location may include a URL that points to a network location. The network location identified by the access location may be associated with a network asset (e.g., network asset 22). For instance, the access location may include a network URL address (e.g., an internet URL address, etc.) at which network asset 22 may be accessed.

According to various embodiments, in generating the view, view module 30 may manage various aspects of content included in views determined by view module 30, but stored remotely from server 14 (e.g., content referenced in markup elements generated by view module 30). Such management may include re-formatting content stored remotely from server 14 to enable client 16 to convey the content (e.g., via display, etc.) to the user. For example, in some instances, client 16 may be executed on a relatively limited platform (e.g., a portable electronic device with limited processing, storage, and/or display capabilities). Server 14 may be informed of the limited capabilities of the platform (e.g., via communication from client 16 to server 14) and, in response, view module 30 may access the content stored remotely in network asset 22 to re-format the content to a form that can be conveyed to the user by the platform executing client 16 (e.g., simplifying visual content, removing some visual content, re-formatting from 3-dimensional to 2-dimensional, etc.). In such instances, the re-formatted content may be stored at network asset 22 by over-writing the previous version of the content, stored at network asset 22 separately from the previous version of the content, stored at a network asset 36 that is separate from network asset 22, and/or otherwise stored. In cases in which the re-formatted content is stored separately from the previous version of the content (e.g., stored separately at network asset 22, stored at network asset 24, cached locally by server 14, etc.), the markup elements generated by view module 30 for client 16 reflect the access location of the re-formatted content.

As was mentioned above, in some embodiments, view module 30 may adjust one or more aspects of a view of instance 32 based on communication from client 16 indicating that the capabilities of client 16 may be limited in some manner (e.g., limitations in screen size, limitations of screen resolution, limitations of audio capabilities, limitations in information communication speeds, limitations in processing capabilities, etc.). In such embodiments, view module 30 may generate markup elements for transmission that reduce (or increase) the complexity of the view based on the capabilities (and/or lack thereof) communicated by client 16 to server 14. For example, view module 30 may remove audio content from the markup elements, view module 30 may generate the markup elements to provide a two dimensional (rather than a three dimensional) view of instance 32, view module 30 may reduce, minimize, or remove information dictating motion of one or more objects in the view, view module 30 may change the point of view of the view (e.g., from a perspective view to a bird's eye view), and/or otherwise generate the markup elements to accommodate client 16. In some instances, these types of accommodations for client 16 may be made by server 14 in response to commands input by a user on client 16 as well as or instead of based on communication of client capabilities by client 16. For example, the user may input commands to reduce the load to client 16 posed by displaying the view to improve the quality of the performance of client 16 in displaying the view, to free up processing and/or communication capabilities on client 16 for other functions, and/or for other reasons. From the description above it should be apparent that as view module 30 "customizes" the markup elements that describe the view for client 16, a plurality of different versions of the same view may be described in markup elements that are sent to different clients with different capabilities, settings, and/or requirements input by a user. This customization by view module 30 may enhance the ability of system 10 to be implemented with a wider variety of clients and/or provide other enhancements.

In some embodiments, client 16 provides an interface to the user that includes a view display 38, a user interface display 40, an input interface 42, and/or other interfaces that enable interaction of the user with the virtual space. Client 16 may include a server communication module 44, a view display module 46, an interface module 48, and/or other modules. Client 16 may be executed on a computing platform that includes a processor that executes modules 44 and 46, a display device that conveys displays 38 and 40 to the user, and provides input interface 42 to the user to enable the user to input information to system 10 (e.g., a keyboard, a keypad, a switch, a knob, a lever, a touchpad, a touchscreen, a button, a joystick, a mouse, a trackball, etc.). The platform may include a desktop computing system, a gaming system, or more portable systems (e.g., a mobile phone, a personal digital assistant, a hand-held computer, a laptop computer, etc.). In some embodiments, client 16 may be formed in a distributed manner (e.g., as a web service). In some embodiments, client 16 may be formed in a server. In these embodiments, a given virtual space implemented on server 14 may include one or more objects that present another virtual space (of which server 14 becomes the client in determining the views of the first given virtual space).

Server communication module 44 may be configured to receive information related to the execution of instance 32 on server 14 from server 14. For example, server communication module 44 may receive markup elements generated by storage module 12 (e.g., via server 14), view module 30, and/or other components or modules of system 10. The information included in the markup elements may include, for example, view information that describes a view of instance 32 of the virtual space, interface information that describes various aspects of the interface provided by client 16 to the user, and/or other information. Server communication module 44 may communicate with server 14 via one or more protocols such as, for example, WAP, TCP, UDP, and/or other protocols. The protocol implemented by server communication module 44 may be negotiated between server communication module 44 and server 14.

View display module 48 may be configured to format the view described by the markup elements received from server 14 for display on view display 38. Formatting the view described by the markup elements may include assembling the view information included in the markup elements. This may include providing the content indicated in the markup elements according to the attributes indicated in the markup elements, without further processing (e.g., to determine motion paths, decision-making, scheduling, triggering, etc.). As was discussed above, in some instances, the content indicated in the markup elements may be indicated by reference only. In such cases, view display module 46 may access the content at the access locations provided in the markup elements (e.g., the access locations that reference network assets 22 and/or 36, or objects cached locally to server 14). In some of these cases, view display module 46 may cause one or more of the content accessed to be cached locally to client 16, in order to enhance the speed with which future views may be assembled. The view that is formatted by assembling the view information provided in the markup elements may then be conveyed to the user via view display 38.

As has been mentioned above, in some instances, the capabilities of client 16 may be relatively limited. In some such instances, client 16 may communicate these limitations to server 14, and the markup elements received by client 16 may have been generated by server 14 to accommodate the communicated limitations. However, in some such instances, client 16 may not communicate some or all of the limitations that prohibit conveying to the user all of the content included in the markup elements received from server 14. Similarly, server 14 may not accommodate all of the limitations communicated by client 16 as server 14 generates the markup elements for transmission to client 16. In these instances, view display module 48 may be configured to exclude or alter content contained in the markup elements in formatting the view. For example, view display module 48 may disregard audio content if client 16 does not include capabilities for providing audio content to the user. As another example, if client 16 does not have the processing and/or display resources to convey movement of objects in the view, view display module 48 may restrict and/or disregard motion dictated by motion information included in the markup elements.

Interface module 48 may be configured to configure various aspects of the interface provided to the user by client 16. For example, interface module 48 may configure user interface display 40 and/or input interface 42 according to the interface information provided in the markup elements. User interface display 40 may enable display of the user interface to the user. In some implementations, user interface display 40 may be provided to the user on the same display device (e.g., the same screen) as view display 38. As was discussed above, the user interface configured on user interface display 40 by interface module 38 may enable the user to input communication to other users interacting with the virtual space, input actions to be performed by one or more objects within the virtual space, provide information to the user about conditions in the virtual space that may not be apparent simply from viewing the space, provide information to the user about one or more objects within the space, and/or provide for other interactive features for the user. In some implementations, the markup elements that dictate aspects of the user interface may include markup elements generated at storage module 12 (e.g., at startup of instance 32) and/or markup elements generated by server 14 (e.g., by view module 30) based on the information conveyed from storage module 12 to server 14 via markup elements.

In some instances, interface module 48 may configure input interface 42 according to information received from server 14 via markup elements. For example, interface module 48 may map the manipulation of input interface 42 by the user into commands to be input to system 10 based on a predetermined mapping that is conveyed to client 16 from server 14 via markup elements. The predetermined mapping may include, for example, a key map and/or other types of interface mappings (e.g., a mapping of inputs to a mouse, a joystick, a trackball, and/or other input devices). If input interface 42 is manipulated by the user, interface module 48 may implement the mapping to determine an appropriate command (or commands) that correspond to the manipulation of input interface 42 by the user. Similarly, information input by the user to user interface display 40 (e.g., via a command line prompt) may be formatted into an appropriate command for system 10 by interface module 48. In some instances, the availability of certain commands, and/or the mapping of such commands may be provided based on privileges associated with a user manipulating client 16 (e.g., as determined from a login). For example, a user with administrative privileges, premium privileges (e.g., earned via monetary payment), advanced privileges (e.g., earned via previous game-play), and/or other privileges may be enabled to access an enhanced set of commands. These commands formatted by interface module 48 may be communicated to server 14 by server communication module 44.

Upon receipt of commands from client 16 that include commands input by the user (e.g., via communication module 26), server 14 may enqueue for execution (and/or execute) the received commands. The received commands may include commands related to the execution of instance 32 of the virtual space. For example, the commands may include display commands (e.g., pan, zoom, etc.), object manipulation commands (e.g., to move one or more objects in a predetermined manner), incarnation action commands (e.g., for the incarnation associated with client 16 to perform a predetermined action), communication commands (e.g., to communicate with other users interacting with the virtual space), and/or other commands. Instantiation module 38 may execute the commands in the virtual space by manipulating instance 32 of the virtual space. The manipulation of instance 32 in response to the received commands may be reflected in the view generated by view module 30 of instance 32, which may then be provided back to client 16 for viewing. Thus, commands input by the user at client 16 enable the user to interact with the virtual space without requiring execution or processing of the commands on client 16 itself.

Figure 2:
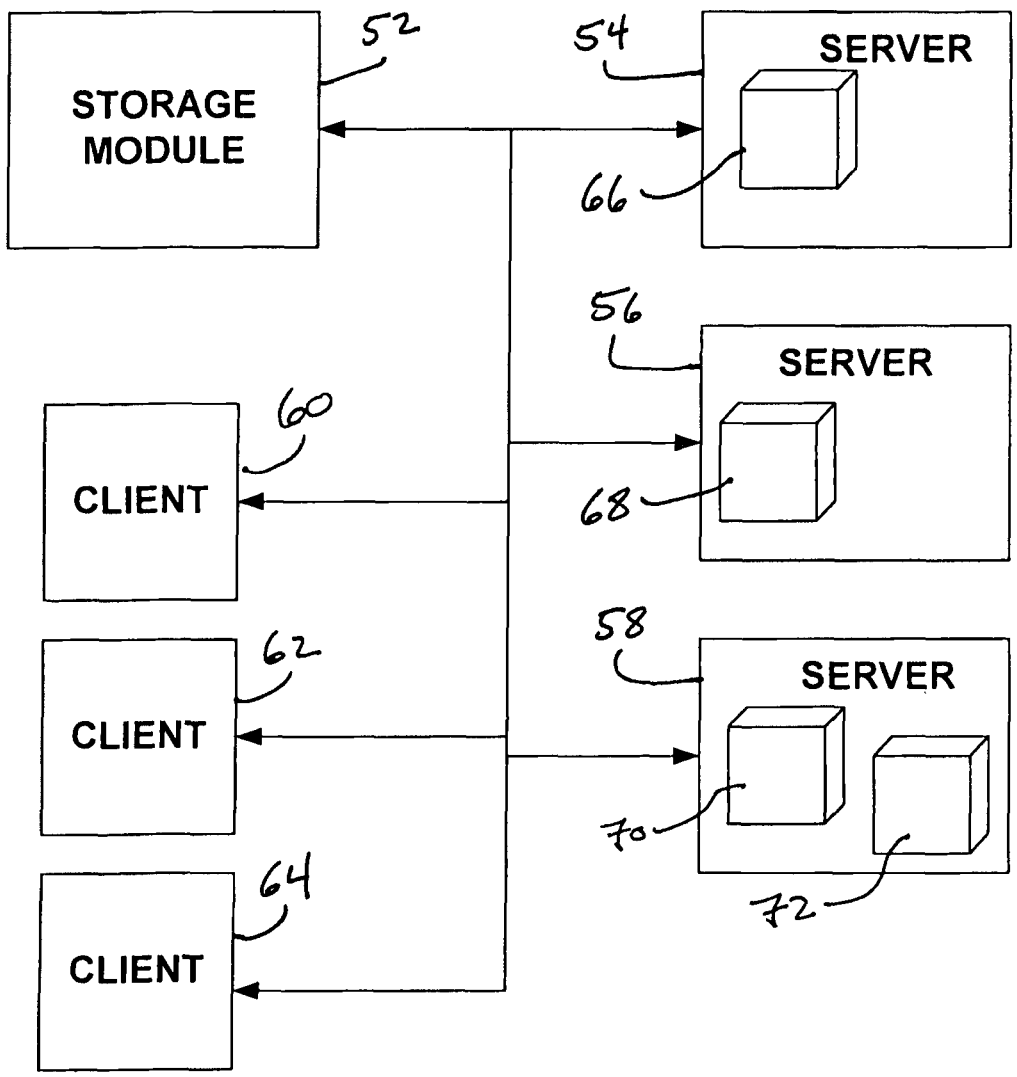
FIG. 2 illustrates a system configured to provide one or more virtual spaces that may be accessible to users, according to one or more embodiments of the invention.

It should be that system 10 as illustrated in FIG. 1 is not intended to be limiting in the numbers of the various components and/or the number of virtual spaces being instanced. For example, FIG. 2 illustrates a system 50, similar to system 10, including a storage module 52, a plurality of servers 54, 56, and 58, and a plurality of clients 60, 62, and 64. Storage module 52 may perform substantially the same function as storage module 12 (shown in FIG. 1 and described above). Servers 54, 56, and 58 may perform substantially the same function as server 14 (shown in FIG. 1 and described above). Clients 60, 62, and 64 may perform substantially the same function as client 16 (shown in FIG. 1 and described above).

Storage module 52 may store information related to a plurality of virtual spaces, and may communicate the stored information to servers 54, 56, and/or 58 via markup elements of the markup language, as was discussed above. Servers 54, 56, and/or 58 may implement the information received from storage module 52 to execute instances 66, 68, 70, and/or 70 of virtual spaces. As can be seen in FIG. 2, a given server, for example, server 58, may be implemented to execute instances of a plurality of virtual spaces (e.g., instances 70 and 72). Clients 60, 62, and 64 may receive information from servers 54, 56, and/or 58 that enables clients 60, 62, and/or 64 to provide an interface for users thereof to one or more virtual spaces being instanced on servers 54, 56, and/or 58. The information received from servers 54, 56, and/or 58 may be provided as markup elements of the markup language, as discussed above.

Due at least in part to the implementation of the markup language to communicate information between the components of system 50, it should be appreciated from the foregoing description that any of servers 54, 56, and/or 58 may instance any of the virtual spaces stored on storage module 52. The ability of servers 54, 56, and/or 58 to instance a given virtual space may be independent, for example, from the topography of the given virtual space, the manner in which objects and/or forces are manifest in the given virtual space, and/or the space parameters of the given virtual space. This flexibility may provide an enhancement over conventional systems for instancing virtual spaces, which may only be capable of instancing certain "types" of virtual spaces. Similarly, clients 60, 62, and/or 64 may interface with any of the instances 66, 68, 70, and/or 72. Such interface may be provided without regard for specifics of the virtual space (e.g., topography, manifestations, parameters, etc.) that may limit the number of "types" of virtual spaces that can be provided for with a single client in conventional systems. In conventional systems, these limitations may arise as a product of the limitations of platforms executing client 16, limitations of client 16 itself, and/or other limitations.

Returning to FIG. 1, in some embodiments, system 10 may enable the user to create a virtual space. In such embodiments, the user may select a set of characteristics of the virtual space on client 16 (e.g., via user interface display 48 and/or input interface 42). The characteristics selected by the user may include characteristics of one or more of a topography of the virtual space, the manifestation in the virtual space of one or more objects and/or unseen forces, an interface provided to users to enable the users to interact with the new virtual space, space parameters associated with the new virtual space, and/or other characteristics of the new virtual space.

The characteristics selected by the user on client 16 may be transmitted to server 14. Server 14 may communicate the selected characteristics to storage module 12. Prior to communication of the selected characteristics, server 14 may store the selected characteristics. In some embodiments, rather than communicating through server 14, client 16 may enable direct communication with storage module 12 to communicate selected characteristics directly thereto. For example, client 16 may be formed as a webpage that enables direct communication (via selections of characteristics) with storage module 12. In response to selections of characteristics by the user for a new virtual space, storage module 12 may create a new space record in information storage 18 that corresponds to the new virtual space. The new space record may indicate the selection of the characteristics made by the user on client 16. For example, the new space record may include topographical information, manifestation information, space parameter information, and/or interface information that corresponds to the characteristics selected by the user on client 16.

Content may be added to the new virtual space by the user in a variety of manners. For instance, content may be created within the context of client 16 or content may be accessed (e.g., on a file system local to client 16) and uploaded to server storage module 12. In some instances, content added to the new virtual space may include content from another virtual space, content form a webpage, or other content stored remotely from client 16. In these instances, an access location associated with the new content may be provided to storage module 12 (e.g., a network address, a file system address, etc.) so that the content can be accessed upon instantiation to provide views of the new virtual space (e.g., by view module 30 and/or view display module 46 as discussed above). This may enable the user to identify content for inclusion in the new virtual space (or an existing virtual space via the substantially the same mechanism) from virtually any electronically available source of content without the content selected by the user to be uploaded for storage on storage module 12, or to server 14 during instantiation (e.g., except for temporary caching in some cases), or to client 16 during display (e.g., except for temporary caching in some cases).

In some embodiments, information storage 18 of storage module 12 includes a plurality of space records that correspond to a plurality of default virtual spaces. Each of the default virtual spaces may correspond to a default set of characteristics. In such embodiments, selection by the user of the characteristics of the new virtual space may include selection of one of the default virtual spaces. For example, one default virtual space may correspond to a turn-based role-playing game space, while another default virtual space may correspond to a first-person shooter game space, still another may correspond to a chat space, and still another may correspond to a real-time strategy game. Upon selection of a default virtual space, the user may then refine the characteristics that correspond to the default virtual space to customize the new virtual space. Such customization may be reflected in the new space record created in information storage 18.

In some embodiments, the user may be enabled to select individual ones of characteristics from the virtual spaces (e.g., point of view, one or more game parameters, an aspect of topography, content, etc.) for inclusion in the new virtual space, rather than an acceptance of all of the characteristics of the selected default virtual space. In some instances, the default virtual spaces may include actual virtual spaces that may be instanced by server 16 (e.g., created previously by the user and/or another user). Access to previously created virtual spaces may provided based on privileges associated with the creating user. For example, monetary payments, previous game-playing, acceptance by the creating user of the selected virtual space, inclusion within a community, and/or other criteria may be implemented to determine whether the creating user should be given access to the previously created virtual space.

Content may be added to the new virtual space by the user in a variety of manners. For instance, content may be created within the context of client 16 or content may be accessed (e.g., on a file system local to client 16) and uploaded to server storage module 12. In some instances, content added to the new virtual space may include content from another virtual space, content form a webpage, or other content stored remotely from client 16. In these instances, an access location associated with the new content may be provided to storage module 12 (e.g., a network address, a file system address, etc.) so that the content can be accessed upon instantiation to provide views of the new virtual space (e.g., by view module 30 and/or view display module 46 as discussed above). This may enable the user to identify content for inclusion in the new virtual space (or an existing virtual space via the substantially the same mechanism) from virtually any electronically available source of content without the content selected by the user to be uploaded for storage on storage module 12, or to server 14 during instantiation (e.g., except for temporary caching in some cases), or to client 16 during display (e.g., except for temporary caching in some cases).

In some implementations, once the user has selected the characteristics of the new virtual space, instantiation module 28 may execute an instance 74 of the new virtual space according to the selected characteristics. View module 30 may generate markup elements for communication to client 16 that describe a view of instance 74 to be provided to the user via view display 46 on client 16 (e.g., in the manner described above). In such implementations, interface module 48 may configure user interface display 40 and/or input interface 42 such that the user may input commands to system 10 that dictate changes to the characteristics of the new virtual space. For example, the commands may dictate changes to the topography, the manifestation of objects and/or unseen forces, a user interface to be provided to a user interacting with the new virtual space, one or more space parameters, and/or other characteristics of the new virtual space. These commands may be provided to server 14. Based on these commands, instantiation module 28 may implement the dictated changes to the new virtual space, which may then be reflected in the view described by the markup elements generated by view module 30. Further, the changes to the characteristics of the new virtual space may be saved to the new space record in information storage 18 that corresponds to the new virtual space. This mode of operation may enable the user to customize the appearance, content, and/or parameters of the new virtual space while viewing the new virtual space as a future user would while interacting with the new virtual space once its characteristics are finalized.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it should be understood that the present invention contemplates that, to the extent possible, one or more features of any embodiment can be combined with one or more features of any other embodiment.

What is claimed is:

1. A client computing device configured to enable a user to create a virtual space, wherein the virtual space is a simulated physical space that has a topography, expresses real-time interaction by the user, and includes one or more objects positioned within the topography that are configured to experience locomotion within the topography, the client computing device comprising:
    a graphic user interface configured to receive selections from the user of a set of characteristics of a virtual space, wherein selection of the set of characteristics dictate (i) aspects of a topography of the new virtual space, and (ii) manifestation of one or more objects positioned within the topography and/or unseen forces experienced by the one or more objects in the new virtual space;
    one or more processors configured to receive, from a server, a plurality of virtual world templates having default selections for the aspects of topographies of virtual spaces and manifestations of objects positioned within the topography and/or unseen forces experienced by the objects in virtual spaces, and to selectively present the templates in the graphic user interface; and
    wherein the graphic user interface is further configured to receive selections from the user of refinements to one or more of the templates.

2. The device of claim 1, wherein the one or more processors are further configured to transmit information conveying selections of the user input to the graphic user interface for storage in electronic storage configured to store, for a plurality of virtual spaces, topographical information and manifestation information.

\* \* \* \* \*